Patented Nov. 22, 1927.

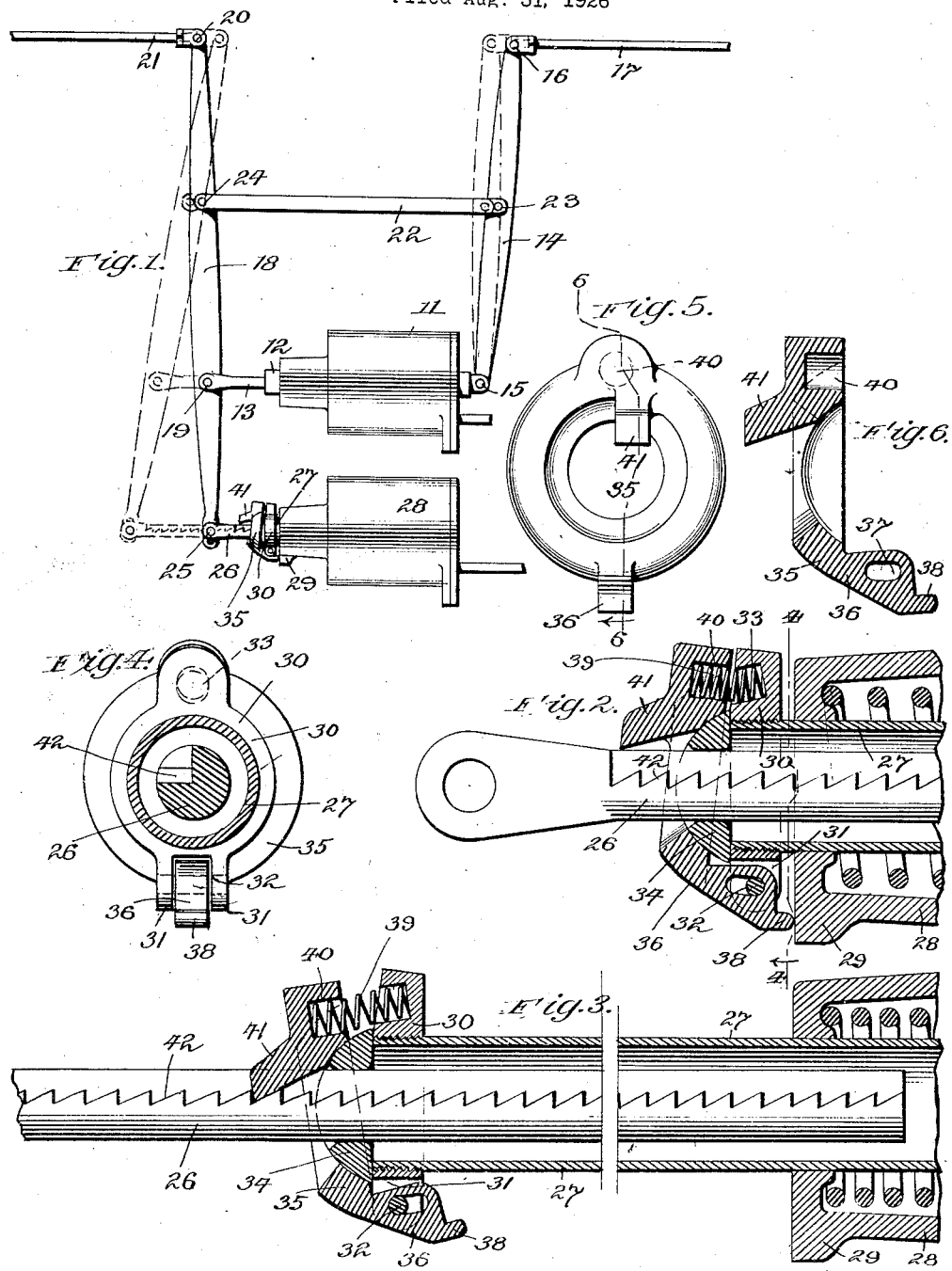

1,649,801

UNITED STATES PATENT OFFICE.

HENRY F. BICKEL, OF PLAINFIELD, NEW JERSEY, ASSIGNOR TO THE NEW YORK AIR BRAKE COMPANY, A CORPORATION OF NEW JERSEY.

PUSH-ROD LATCH FOR AIR BRAKES.

Application filed August 31, 1926. Serial No. 132,811.

This invention relates to air brakes, and particularly to a latching mechanism for connecting a brake cylinder piston in thrust relation with the brake rigging, after another brake cylinder piston has taken up the slack.

Many two-cylinder brake systems have been proposed in which one cylinder takes up the slack, whereupon a second cylinder is rendered active, is latched to the brake rigging and becomes effective in the application of the brakes with a minimum piston travel. The usual method of latching the brake cylinder to the brake rigging is to allow the push rod of the auxiliary cylinder to be drawn outward through the tubular piston rod as the slack is taken up, and as soon as the piston rod starts to move outward a latch rendered effective by such motion establishes a connection between the piston rod and the push rod.

The present invention relates to the construction of such a latch, and the object of the invention is to provide a form of latch which will permit angular and lateral motion of the push rod relatively to the tubular piston rod without affecting the engagement of the latch or the ability of the latch to engage initially.

This result is accomplished by supporting the latch in such a way that it is capable of universal angular motion and also of lateral sliding motion relatively to the tubular piston rod, both such motions being somewhat limited in extent, but adequate to meet the requirements of service.

A preferred embodiment of the invention is illustrated in the accompanying drawings, in which—

Figure 1 is a diagrammatic view showing main and auxiliary brake cylinders and their connection to the foundation brake gear according to the present invention.

Figure 2 is a longitudinal axial section through the outer end of the piston rod guide and the piston rod of the auxiliary cylinder showing the improved latch applied. In this view the piston rod is shown retracted in the position assumed during release and until the auxiliary brake cylinder commences to function.

Figure 3 is a similar view showing the parts in the position assumed after the auxiliary piston rod has started its outward motion.

Figure 4 is a section on the line 4—4 of Fig. 2.

Figure 5 is a detail elevation of the latch element.

Figure 6 is a section thereof on the line 6—6 of Figure 5.

The main brake cylinder is shown at 11 and of course is supported on the car frame. The usual tubular piston rod is shown at 12 and the push rod at 13. It will be understood that as is usual the push rod 13 enters the piston rod 12 and is in thrust relation therewith at its inner end adjacent the piston. This is standard construction in the art.

One brake lever is shown at 14 and is fulcrumed at 15 to the head of the cylinder 11. It is also pinned at 16 to the brake rod 17. The other brake lever 18 is pinned at 19 to the push rod 13 and at 20 to the brake rod 21. Levers 14 and 18 are connected by the usual connecting rod 22 which is pinned to them at 23 and 24 respectively. The brake lever 18 extends beyond the pivot pin 19 and is pinned at 25 to the push rod 26 which extends loosely into the piston rod 27 of the auxiliary brake cylinder 28. The piston rod guide of the cylinder 28 is formed with an extension or lug 29 which acts as a disengaging stop for the latch about to be described when the auxiliary piston is in its fully retracted position.

Various valve mechanisms have heretofore been proposed controlling two such cylinders as 11 and 28 in such manner that air is first admitted to the cylinder 11 to take up the slack in the brake rigging. In such action the push rod 26 moves outward through the piston rod 27 of the auxiliary cylinder 28, the piston of the cylinder 28 remaining in its retracted position. As soon as the slack has been taken up air is admitted to the cylinder 28, forcing out its piston rod 27. The initial outward motion of the piston rod causes this rod to latch to the push rod 26.

Latch mechanisms for accomplishing this function have heretofore been known, but they have not worked satisfactorily in all cases, and I have discovered that one contributing cause of such improper actuation is that the push rod 26 necessarily has angular and lateral motions relatively to the piston rod 27 and the latch mechanisms heretofore used have not been adapted to accommodate themselves to such motions. The present invention resides in a latch mechanism designed to overcome this difficulty.

A collar 30 is threaded on the forward end of the auxiliary piston rod 27. It is formed with a pair of spaced lugs 31 in which a cross pin 32 is fixed. It is also formed with a cylindrical recess 33 which serves as a spring seat for the spring which engages the latch.

In abutting relation with the forward end of the piston rod 27 and with the central portion of the collar 30 is an annular thrust member 34 which has one flat surface in sliding engagement with the collar 30 and the end of the piston rod and which has an opposed convex spherical surface against which the latch member proper seats. This latch member is indicated generally by the numeral 35 and has a concave spherical seat which engages with the spherical convex portion of the annular thrust member 34. The member 35 is formed with a lug 36 which extends between the lugs 31 and which has a slot of limited extent in which the pin 32 works. The purpose of the slot is to permit angular motion of the latch member 35 on the thrust member 34. The latch member 35 is formed with a nose 38, which, as the piston rod 27 moves inward near its limit of motion, engages the boss 29 and forces the latch member 35 to swing around the pin 32, to disengage the latch. In doing so the latch member 35 is swung against the opposition of a spring 39 which is seated in the seat 33 and also in a companion seat 40 on the latch member 35.

Latch member 35 carries a latch nose 41 which coacts with ratchet teeth 42 formed in one face of a right angle groove in the push rod 26. In the position of Figure 2 the lug 38 engages the boss 29 and holds the pin 32 in one end of the slot 37, with the spring 39 compressed and the latch 41 disengaged from the tooth 42. As the piston rod 27 moves outward slightly from its inmost position, the spring 39 shifts the latch member 35 to the position shown in Figure 3 in which the latch nose 41 engages one of the teeth 42.

It will be observed that this connection will be established even if the push rod 26 and the tubular piston rod 27 are not absolutely aligned, and the engagement will be maintained regardless of disalignment. In maintaining the desired engagement, latch member 35 is capable of universal angular motion of the thrust member 34 and the latter is capable of lateral motion relatively to the collar 30 and piston rod 27.

Obviously various structural changes are possible, an important feature of novelty being the capability which the latch has of limited universal angular motion, and this feature in combination with limited lateral motion, both relatively to the piston rod 27.

What is claimed is:

1. The combination with a tubular piston rod and a toother push rod loosely mounted therein, of a latch for connecting the two; and a mounting for said latch, permitting universal lateral swinging motion thereof while engaged.

2. The combination with a tubular piston rod and a toothed push rod loosely mounted therein, of a latch for connecting the two; and supporting means for said latch permitting the latch while engaged to have lateral motion and universal lateral swinging motion of limited extent relatively to said piston rod.

3. The combination with a tubular piston rod and a toothed push rod loosely mounted therein, of a thrust member carried on the end of said piston rod and slidable laterally thereon, said thrust member having a spherical face; and a latch member mounted for universal lateral swinging motion on said face while engaged with said push rod.

4. The combination of a tubular piston rod; a toothed push rod loosely mounted therein; a collar having a spring seat and an opposed fulcrum; a thrust member mounted in transverse sliding relation with said tubular piston rod and having a spherical face; a latch member adapted to engage the teeth on said push rod and in thrust engagement with the spherical face of said thrust member, said latch member having a lost motion connection with said fulcrum; a spring mounted in said spring seat and engaging said latch member to urge the same in engaging direction; and a stop lug for disengaging said latch as said piston rod approaches its retracted position.

5. The combination with a tubular piston rod and a toothed push rod loosely mounted therein, of a collar fixed on the end of the piston rod and having at one side a fulcrum and at the other side a spring seat; an annular thrust member surrounding the push rod and having opposed thrust faces, one of which is spherical and the other of which is flat and in thrust contact with said collar; an annular latch member surrounding said push rod in position to engage the spherical face of said thrust member and having a latch nose capable of engaging the teeth thereon; said latch member having a slot embracing said fulcrum pin, a spring seat and a stop lug; a spring mounted with its ends in said spring seats and urging said latch nose in engaging direction; and a stop member arranged to collide with the lug on said latch member and release said latch nose from said teeth as the tubular piston rod arrives at its retracted position.

In testimony whereof I have signed my name to this specification.

HENRY F. BICKEL.